G. A. DONAHUE.
NUT LOCK.
APPLICATION FILED JUNE 15, 1916.

1,225,419.

Patented May 8, 1917.

Witness
H. W. Burton

Inventor
George A. Donahue
By W. W. Williamson
Attorneys

UNITED STATES PATENT OFFICE.

GEORGE A. DONAHUE, OF WILMINGTON, DELAWARE.

NUT-LOCK.

1,225,419.
Specification of Letters Patent.
Patented May 8, 1917.

Application filed June 15, 1916. Serial No. 103,818.

*To all whom it may concern:*

Be it known that I, GEORGE A. DONAHUE, a citizen of the United States, residing at Wilmington, in the county of New Castle and State of Delaware, have invented new and useful Improvements in Nut-Locks, of which the following is a specification.

My invention relates to new and useful improvements in nut locks, and has for its object to provide an exceedingly simple and effective device of this character, which will lock the nut to the bolt on which it is mounted, thereby preventing said nut from being accidentally displaced from the bolt or moved along thereon after being once adjusted.

A further object of the invention is to provide a nut with means for locking the same to a bolt, said means being capable of ready disengagement from the bolt, so that the nut may be adjusted.

A still further object of the invention is to provide a unique construction of locking means for a nut, which may be normally held in engagement with the bolt, which may be readily disengaged from the bolt, but which cannot be accidentally displaced from the nut when the same is upon a bolt.

With these ends in view, this invention consists in the details of construction and combination of elements hereinafter set forth and then specifically designated by the claims.

In order that those skilled in the art to which this invention appertains, may understand how to make and use the same, I will describe its construction in detail, referring by numeral to the accompanying drawing forming a part of this application, in which—

Figure 1:
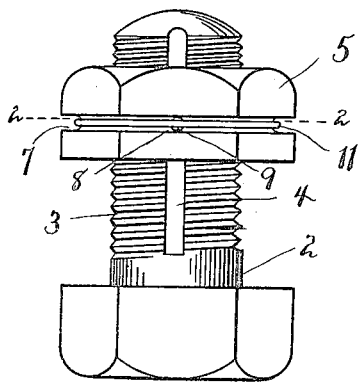
Figure 1, is a side elevation of a nut embodying my improvement showing the same mounted upon a bolt.
Figure 2:
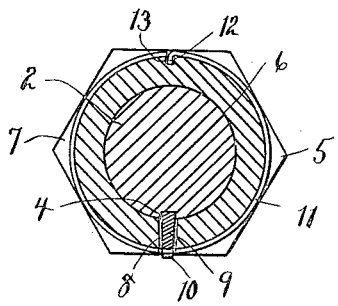
Fig. 2, is a section at the line 2—2 of Fig. 1.
Figure 3:
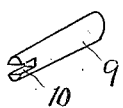
Fig. 3, is an enlarged perspective view of the locking pin.

In carrying out my invention as here embodied 2 represents a bolt threaded as at 3, and provided with a longitudinal locking groove 4 running from the outer end of the toe of the bolt toward the head, and throughout the major portion thereof. On this bolt is threaded the nut 5 having the ordinary receiving opening 6, and provided with an annular or circumferential groove 7 extending entirely around the same, intermediate the inner and outer faces and on the exterior thereof.

A tapered opening 8 is formed in the nut communicating with the bolt receiving opening 6, and the groove 7, with its wider portion or greater diameter at the inner end, or at the point where it communicates with the bolt receiving opening 6. In this tapered opening 8 is mounted the similarly tapered locking pin 9, its larger end projecting into the bolt receiving opening 6, and adapted to engage the groove 4 in the bolt. The outer or smaller end of this locking pin is provided with a notch 10 in which rests, or through which passes the spring 11, said spring being formed from a relatively small gage wire and preferably extending entirely around the nut, with one end bent at an angle thereto to form an extension 12, which projects into a hole 13 formed in the nut, preferably opposite the opening 8, whereby said spring 11 is prevented from rotating upon the nut, which might cause the spring to become disengaged from the locking pin should one of the ends of said spring reach the locking pin.

From the foregoing description it will be seen that when the spring 11 is in engagement with the slot of the locking pin 9, said locking pin will be normally forced inward to cause it to register with a cavity in the bolt, such as the groove 4, thereby preventing the nut from being turned upon the bolt.

When it is desired to place the nut upon the bolt or adjust the same upon the bolt, the wire spring 11 is withdrawn from the groove 10 in the locking pin 9, thus leaving said locking pin free to be withdrawn until its inner end is within the opening 8 or beyond the line of the bolt receiving opening 6, at which time the nut may be threaded on or off of the bolt.

Because of the shape of the locking pin and the opening in which it is mounted, said locking pin is held against accidental displacement, while the nut is upon the bolt, nor can it be withdrawn unless the nut is backed off of the bolt a sufficient distance to carry the locking pin beyond the end of the bolt, and should the spring be removed from the locking pin, and the locking pin withdrawn from the cavity within the bolt, said locking pin will not be lost, and when the cavity in the bolt and the locking pin are in proper relative positions, said locking pin will be caused to engage the cavity by gravity.

The gist of the invention consists in providing a bolt with a cavity with which is adapted to register a locking pin of peculiar construction, whereby it is held against accidental displacement, carried by a nut having a circumferential groove in which is mounted a spring arranged to normally force the locking pin inward, and it will be readily understood by anyone skilled in the art to which this invention appertains that the bolt may be provided with a number of cavities such as grooves or holes, and where the latter are used, they must be formed in the same projection as the thread, and it will also be understood that more than one locking pin may be used, so that different adjustments may be obtained.

The spring 11 may be entirely dispensed with if the nut 10 in the pin is made of sufficient length to permit the fingers formed therein to spring inward and outward, as said fingers would then bind sufficiently upon the walls of the hole 8 to prevent the the locking pin 9 from being jarred outward by the vibrations of the machine or work obtained when the nut lock is used.

Of course I do not wish to be limited to the exact details of construction as herein shown, as these may be varied within the limits of the appended claims without departing from the spirit of my invention.

Having thus fully described my invention, what I claim as new and useful, is—

1. In a nut lock a bolt having a cavity, a nut provided with a tapered opening mounted on said bolt, the larger end of said opening being inward, and a tapered locking pin mounted in said opening.

2. In a nut lock a bolt having a cavity, a nut provided with a tapered opening mounted on said bolt, the larger end of said opening being inward, a tapered locking pin mounted in said opening, and means for normally forcing said locking pin inward.

3. In a nut lock a bolt having a cavity, a nut provided with a tapered opening mounted in said bolt, the larger end of said opening being inward, and a spring actuated tapered locking pin mounted in said opening with the larger end inward, said larger end arranged to engage the cavity in the bolt.

4. In a nut lock the combination with a bolt having a longitudinal groove, of a nut provided with a bolt receiving opening having a circumferential groove, said nut also provided with a hole leading from said groove, a tapered opening communicating with said groove and the bolt receiving opening, said tapered opening having its larger end in communication with the bolt receiving opening, a tapered locking pin mounted in the tapered opening with its larger end projecting into the bolt receiving opening, said locking pin having a notch in its smaller or outer end, an annular wire spring adapted to surround the nut mounted in the circumferential groove and register with the notch in the locking pin, and an extension formed from one end of said spring and engaging the hole in the nut to prevent rotation thereof.

In testimony whereof, I have hereunto affixed my signature in the presence of the subscribing witness.

GEORGE A. DONAHUE.

Witness:
M. TOBIAS.

Copies of this patent may be obtained for five cents each, by addressing the "Commissioner of Patents, Washington, D. C."